(12) United States Patent
Sturm et al.

(10) Patent No.: US 11,781,941 B2
(45) Date of Patent: Oct. 10, 2023

(54) MULTI-DEGREE-OF-FREEDOM IMPEDANCE FIXTURE FOR AUTOMATED FREQUENCY RESPONSE FUNCTION MEASUREMENTS

(71) Applicant: Robert Bosch GmbH, Stuttgart (DE)

(72) Inventors: Michael Sturm, Milford, MI (US); Kevin Wienen, Farmington Hills, MI (US); Michael Yankonis, Whitmore Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/583,923

(22) Filed: Jan. 25, 2022

(65) Prior Publication Data
US 2023/0236084 A1    Jul. 27, 2023

(51) Int. Cl.
| | | |
|---|---|---|
| *G01M 7/02* | (2006.01) | |
| *G01M 7/06* | (2006.01) | |
| *G01M 17/06* | (2006.01) | |

(52) U.S. Cl.
CPC .............. *G01M 7/027* (2013.01); *G01M 7/06* (2013.01); *G01M 17/06* (2013.01)

(58) Field of Classification Search
CPC ......... G01M 7/027; G01M 7/06; G01M 17/06
See application file for complete search history.

(56) References Cited

U.S. PATENT DOCUMENTS

| | | |
|---|---|---|
| 5,434,549 A | 7/1995 | Hirabayashi et al. |
| 5,884,736 A | 3/1999 | Burdisso et al. |

(Continued)

FOREIGN PATENT DOCUMENTS

| | | |
|---|---|---|
| DE | 102005049620 A1 | 5/2007 |
| EP | 0574574 B1 | 6/1997 |

(Continued)

OTHER PUBLICATIONS

Astratini-Enache et al., "Moving Magnet Type Actuator with Ring Magnets", Journal of Electrical Engineering, vol. 61, No. 7/s, 2010, pp. 144-147.

(Continued)

*Primary Examiner* — Suman K Nath
(74) *Attorney, Agent, or Firm* — Michael Best & Friedrich LLP

(57) ABSTRACT

System and methods for characterizing a response of a structure-under-test to applied excitation forces using a test fixture. The fixture is selectively coupleable to the structure-under-test and is configured to hold the structure-under-test at a known position and in a known orientation relative to the fixture. A plurality of excitation devices and response sensors are coupled to the fixture. Excitation forces applied to the fixture by the excitation devices are conveyed by the fixture to the structure-under-test and each response sensor measures a dynamic response indicative of a response of the structure-under-test and the fixture to the applied excitation force. A controller receives response sensor data and applies a mathematical coordinate transformation to project the forces and moments corresponding to the applied excitation and the measured dynamic responses to a target point of the structure-under-test and to calculate a system response function based at least in part on the projection.

16 Claims, 14 Drawing Sheets

(56) References Cited

U.S. PATENT DOCUMENTS

| | | | |
|---|---|---|---|
| 5,979,242 A | 11/1999 | Hobbs | |
| 6,002,184 A | 12/1999 | Delson et al. | |
| 6,105,943 A | 8/2000 | Nagasawa | |
| 6,377,900 B1* | 4/2002 | Ueno | G01M 7/022 318/632 |
| 6,721,668 B1* | 4/2004 | Momoi | G01M 7/06 702/33 |
| 7,024,315 B2 | 4/2006 | Giurgiutiu | |
| 7,487,679 B2 | 2/2009 | Sirrine et al. | |
| 7,994,741 B2 | 8/2011 | Delson | |
| 8,281,659 B2 | 10/2012 | Napolitano | |
| 8,398,570 B2 | 3/2013 | Mortimer et al. | |
| 8,408,066 B1 | 4/2013 | Romero et al. | |
| 9,331,558 B2 | 5/2016 | Clamme | |
| 9,887,612 B1 | 2/2018 | Eghbal | |
| 10,317,373 B2 | 6/2019 | Larkin et al. | |
| 10,386,339 B2 | 8/2019 | Zhuge et al. | |
| 10,827,280 B2 | 11/2020 | Linjama et al. | |
| 2011/0239771 A1* | 10/2011 | Wu | G01M 7/06 73/663 |
| 2014/0150526 A1 | 6/2014 | Powers et al. | |
| 2015/0028715 A1 | 1/2015 | Tsuiki et al. | |
| 2016/0126821 A1 | 5/2016 | Iwaki et al. | |
| 2019/0120717 A1* | 4/2019 | Gysling | G01M 5/0066 |
| 2020/0232874 A1 | 7/2020 | Underwood | |
| 2021/0172829 A1 | 6/2021 | Kim | |

FOREIGN PATENT DOCUMENTS

| | | |
|---|---|---|
| EP | 1020013 B1 | 4/2004 |
| JP | H0593671 A | 4/1993 |
| JP | 2013167557 A | 8/2013 |
| KR | 20120133656 A | 12/2012 |

OTHER PUBLICATIONS

De Klerk, "Solving the RDoF problem in experimental dynamic substructuring", Proceedings of the XXVI International Modal Analysis Conference, 2007, 9 pages.

Elliott et al., "Moment excitation and the measurement of moment mobilities", Journal of Sound and Vibration, 20112, vol. 331, pp. 2499-2519.

International Organization for Standardization, ISO 20270: 2019 Acoustics—Characterization of sources of structureborne sound and vibration—Indirect measurement of blocked forces, 2019, 47 pages.

Meggitt et al., "On the Problem of Describing the Coupling Interface Between Sub-structures: An Experimental Test for Completeness", Computer Science, Chapter 14, 2018, pp. 171-182.

Strum et al., "Robust NVH Development of Steering Systems Using In-Situ Blocked Forces from Measurements with Low-Noise Driver Simulators", Noise-Con, 2017, 8 pages.

Van der Seijs, "Experimental Dynamic Substructuring: Analysis and design strategies for vehicle development", PhD Thesis, Technical University Delft, 2016, 209 pages.

Van der Seijs et al., "An Improved Methodology for the Virutal Point Transformatoin of Measured Frequency Response Functions in Dynamic Substructuring", 4th ECCOMAS Thematic Conference on Computational Methods in Structural Dynamics and Earthquake Engineering, 2013, pp. 4334-4347.

International Search Report for Application No. PCT/EP2023/051423 dated Apr. 6, 2023 (5 pages).

International Search Report for Application No. PCT/EP2023/051422 dated Apr. 21, 2023 (5 pages).

International Search Report for Application No. PCT/EP2023/051420 dated Apr. 25, 2023 (4 pages).

International Search Report for Application No. PCT/EP2023/051421 dated Apr. 25, 2023 (4 pages).

Beato-López et al., "A Combination of a Vibrational Electromagnetic Energy Harvester and Giant Magnetoimpedance (GMI) Sensor," Sensors, 2020, vol. 20, No. 7, 17 pages.

Van der Seijs et al., "A Robust Transfer Parth Analysis Method for Steering Gear Vibrations on a Test Bench," Proceedings of the International Conference on Noise and Vibration Engineering (ISMA), 2014, pp. 4027-4040.

International Search Report for Application No. PCT/EP2023/051418 dated Mar. 28, 2023 (5 pages).

Napolitano et al., "Multiple Sine Sweep Excitation for Ground Vibration Tests," Proceedings of the IMAC-XXVII, 2009, pp. 1753-1768.

International Search Report for Application No. PCT/EP2023/051417 dated May 2, 2023 (4 pages).

* cited by examiner

MULTI-DEGREE-OF-FREEDOM IMPEDANCE FIXTURE FOR AUTOMATED FREQUENCY RESPONSE FUNCTION MEASUREMENTS

BACKGROUND

The present invention relates to systems and methods for measuring a system response function of a system or structure. In some implementations, the invention relates to systems and methods for applying an excitation force to a system or structure and measuring a response of the system or structure to the applied excitation force.

SUMMARY

In some implementations, a system response function (SRF) is characterized by applying a known excitation force to a structure-under-test and then measuring a resulting response (e.g., an acceleration response). To obtain meaningful results, one or more exciter devices and one or more response sensors are coupled to the structure-under-test in different directions (e.g., x, y, and z directions of the Cartesian coordinate system). The exciter devices may include, for example, a shaker device configured to apply a vibrational force or an impact force to the structure-under-test and the response sensors may include, for example, accelerometers. In some implementations, the exciter devices and response sensors may be installed permanently on the structure-under-test. However, permanent installation requires that new instrumentation be used to measure the SRF for each different structure. When measuring the SRF for a plurality of different structures (e.g., assembled in a production line), using new instrumentation for each structure can increase production cost and introduce experimental uncertainties and errors between measurements due to inaccuracies and variations in the instrumentation). Conversely, if the same set of instrumentation is used for SRF measurements on multiple different structures by temporarily installing the instrumentation on each structure, experimental uncertainties and measurement errors can still result due to variations in instrumentation placement and possible changes to the instrumentation due to repeated attachment, removal, and associated handling.

Accordingly, in various implementations, the systems and methods described in this disclosure provide a fixture for permanent installation of measurement hardware at predefined positions for quick and reliable automated SRF measurements. In some implementations, the fixture is coupled to a test bench and configured to hold a structure-under-test during the SRF measurement process. After the SRF measurement process is completed, the structure-under-test is removed (e.g., decoupled from the fixture) and another structure-under-test can be selectively coupled to the fixture for SRF measurement. In this way, the instrumentation (e.g., the excitation devices and the response sensors) remains in place while different structures are coupled to the fixture for SRF measurements and the placement of each exciter device & response sensor relative to the other exciter devices & response sensors and relative to the structure-under-test remains constant for the SRF measurements for each different structure, for among other things, to allow for consistent data acquisition.

When measuring the SRF for a plurality of different structures (e.g., different structure of the same design assembled in a production line), installing the instrumentation for each test on the structure-under-test increases testing time and effort. It may also introduce experimental uncertainties and errors between measurements due to inaccuracies and variations in the instrumentation. Conversely, if the same set of instrumentation is used for SRF measurements on multiple different structures by permanently installing the instrumentation on an impedance fixture, which in turn is connected to each structure-under-test, experimental uncertainties and measurement errors can be minimized due to no variations in instrumentation placement and possible changes to the instrumentation due to repeated attachment, removal, and associated handling. In some implementations, the impedance fixture operates as "an instrumented washer" to connect the structure-under-test to the test bench. This "instrumented washer" holds all exciters and sensors (which would otherwise be "glued") to the structure-under-test. Therefore, test results and measurements can be more accurate (no operator uncertainty) and faster, and the Cartesian coordinate system remains the same during all measurements (the coordinate system is defined by the permanently installed instrumentation).

In some implementations, the impedance fixture (including the permanently attached instrumentation) acts as a passive structural component mounted between the structure-under-test and the test bench (similar to a complex designed washer). The impedance fixture won't alter the intended operation of the structure-under-test (e.g. steering from left to right in a test procedure to characterize the acoustic performance of steering systems on a bench). In some implementations, when the SUT is turned off (no steering maneuver), the exciter devices attached to the impedance fixture are operated one at a time to characterize the SRFs of the system. In some implementations, the measurement location of interest (e.g. the center of the steering mount) is inaccessible for direct measurement (i.e., force and moment excitation and translational and rotational response measurement in the center of the mount). In this scenario, a coordinate transformation may be used to project the force excitations and response measurements on the impedance fixture onto a point of interest (e.g. center of the steering mount). In other words, force excitations and response measurements on the impedance fixture (in the proximity of the point of interest) are used to determine "virtual excitations and responses". In some implementations, the impedance fixture is rigid in the area close to the point of interest so that an accurate coordinate transformation can be performed. In other words, the impedance fixture behaves like a rigid body in the frequency range of interest (where the SRFs are analyzed; e.g. 10 Hz-3 kHz) without local flexibilities (eigenfrequencies between 10 Hz-3 kHz of the impedance fixture itself). Otherwise, local flexibilities may lead to an error in the coordinate transformation (which is a linear projection).

In one embodiment, the invention provides a system for characterizing a response of a structure-under-test (and/or the combined response of the structure-under-test and the fixture coupled thereto) to applied excitation forces. The system includes a fixture, a plurality of excitation devices, and a plurality of response sensors. The fixture is selectively coupleable to the structure-under-test and is configured to hold the structure-under-test at a known position and in a known orientation relative to the fixture. Each excitation device of the plurality of excitation devices is coupled to the fixture at a different known location and a different known orientation relative to the fixture and is configured to controllably apply an excitation force to the fixture. Each response sensor of the plurality of response sensors is coupled to the fixture and configured to sense a dynamic response. The excitation force applied to the fixture by each of the excitation devices is conveyed by the fixture to the structure-under-test and the dynamic response measured by each of the response sensors is indicative of a response of the structure-under-test to the applied excitation force. In some implementations, the system includes a controller configured to receive response sensor data and apply a mathematical coordinate transformation to project the forces and moments to a target point of the structure-under-test and to calculate a system response function based at least in part on the projection. In some implementations, the excitation devices are arranged to apply linear excitation forces in directions parallel to at least three different axes relative to a target point of the structure-under-test and to apply rotational excitation forces around each of the at least three different axes relative to the target point of the structure-under-test.

In some implementations, the invention provides a method of operating the system by selectively coupling a first structure-under-test to the fixture, selectively and controllably operating the plurality of excitation devices to apply a plurality of excitation forces to the first structure-under-test, receiving force response data, and then applying the mathematical coordinate transformation to project the forces and moments to the target point before calculate the system response function. The first structure-under-test is then decoupled from the fixture and a second structure-under-test is coupled to the fixture without changing the relative positions and orientations of the excitation devices or the response sensors. The excitation devices are then selectively and controllably operated to apply the plurality of excitation forces to the second structure-under-test, new force response data is received for the second structure-under-test, and the mathematical coordinate transformation is applied again to project the forces and moments for the second structure-under-test to the target point before calculating a system response function for the second structure-under-test.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
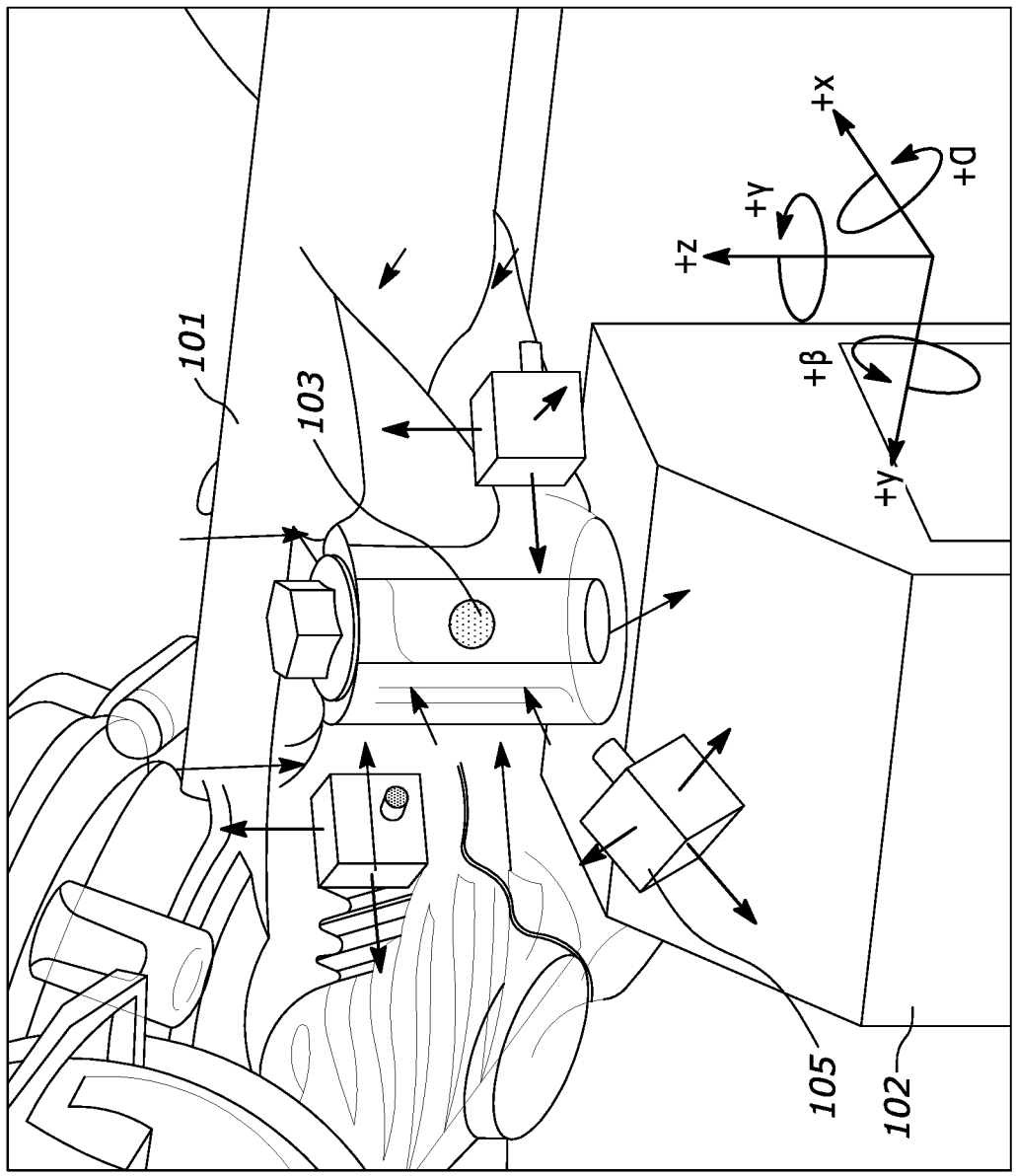
FIG. 1 is a perspective view of a schematic diagram of excitation forces applied to a structure-under-test and response accelerations measured during the SRF measurement process.

FIG. 1 illustrates an example of a steering system 101 coupled to a test bench 102. While coupled to the test bench 102, the steering system undergoes a process for characterizing a system response function (SRF) at a center point 103 of the steering mount of the steering system 101. More particularly, in some implementations, the process measures a combined system response of the steering system 101 and the test bench 102 to which the steering system 101 is coupled in the x, y, and z-directions of the cartesian coordinate system and the corresponding rotations $\alpha$, $\beta$, and $\gamma$, as indicated by the reference legend in FIG. 1. In some implementations, this type of SRF characterization may be performed by applying force and moment excitation in each Cartesian and rotational direction and measuring the resulting rectilinear and angular acceleration response. To reduce system, measurement, and calculation complexity, in some other implementations, mathematical coordinate transformations are used to project forces and responses onto the point of interest (i.e., the center point 103 of the steering mount). In the example of FIG. 1, the arrows pointing towards the steering system 101 represent projected forces and the arrows extending from the cube-shaped tri-axial accelerometers 105 represent the projected responses. Accordingly, measurements in the rigid area close to the target position (e.g., the center point 103 of the steering mount) can be used to obtain translational and rotational information. However, this requires a relatively high-accuracy knowledge of the position and direction of each force/response measurement relative to the point of interest (e.g., the center point 103 of the steering mount).

Figure 2:
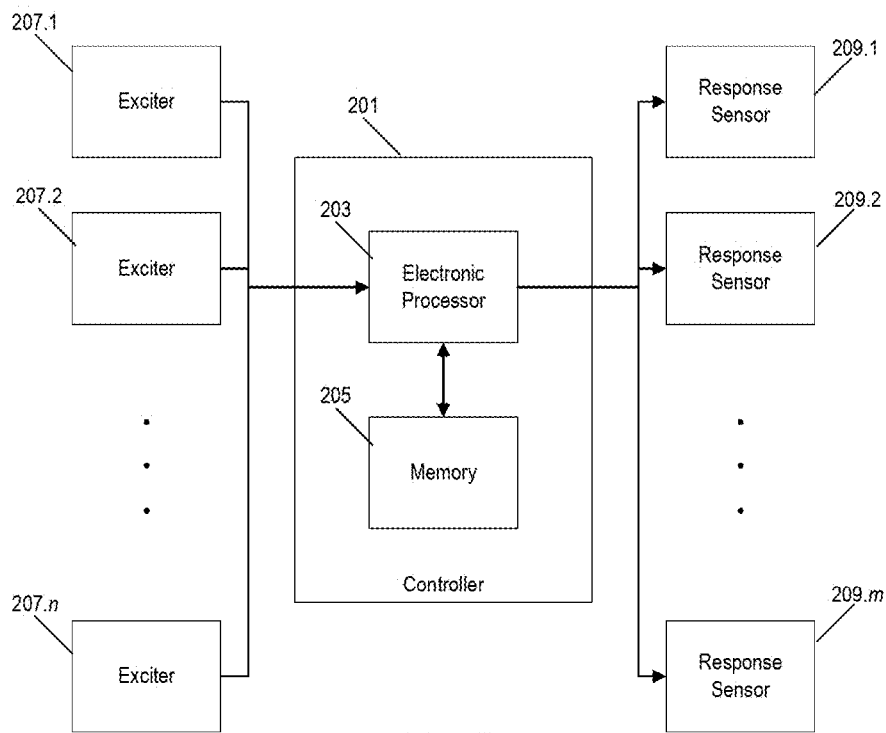
FIG. 2 is a block diagram of a control system for an automated SRF measurement process.

In some implementations, a plurality of exciter devices (e.g., "shakers" configured to apply a vibrational force by alternating linear movement of a weighted body of the shaker) and a plurality of response sensors (e.g., accelerometers) are configured onto a rigid fixture that is selectively couplable to a structure-under-test (e.g., the steering system 101 of FIG. 1) at a known, fixed location. FIG. 2 illustrates an example of a control system for performing a series of multi-degree of freedom excitation/response measurements of a structure-under-test. A controller 201 includes an electronic processor 203 and a non-transitory computer-readable memory 205. The memory 205 stores data and/or computer-executable instructions. The electronic processor 203 is communicatively coupled to the memory 205 and executes the instructions stored on the memory 205 to provide the functionality of the controller 201 (including, for example, the functionality described herein).

The controller 201 is communicative coupled to a plurality of exciter devices 207.1, 207.2, 207.n and is configured to selectively apply an excitation signal to one or more of the exciter devices 207.1, 207.2, 207.n. Each exciter device 207.1, 207.2, 207.n is configured to induce an excitation force (e.g., a vibrational force and/or an impact force) in accordance with the excitation signal in response to receiving the excitation signal. In some implementations, the exciter devices 207.1, 207.2, 207.n are magnetically-actuated devices and the control signal is provided in the form of an alternating electrical current that is applied to an electromagnet coil of the exciter device 207.1, 207.2, 207.n to drive movement of a weighted body of the exciter device 207.1, 207.2, 207.n. In other implementations, the exciter devices may be actuated, for example, pneumatically, hydraulically, or mechanically (e.g., a device with a pretensioned spring that is released to apply an impact).

The controller 201 is also communicatively coupled to a plurality of response sensors 209.1, 209.2, 209.m. In some implementations, the response sensors 209.1, 209.2, 209.m each include one or more accelerometers (or, for example, a tri-axial accelerometer). When the excitation force is applied to a structure-under-test (e.g., the steering system 101) by an exciter device 207.1, 207.2, 207.n, the response sensors 209.1, 209.2, 209.m measure how the structure-under-test (and the fixture attached thereto) responds to the applied excitation force (i.e., how an applied force travels through the structure-under-test to another location) and each transmit a signal to the controller 201 indicative of the measured response (e.g., a measured acceleration, velocity, and/or displacement). In some implementations, where the testing is performed using an impedance fixture, the dynamic response of the connected parts (e.g., the structure-under-test, the fixture, and any other components that might be coupled thereto) is measured by the response sensors 209.1, 209.2, 209.m in order to perform an in-situ blocked force measurement. In some implementations, a response sensor 209.1, 209.2, 209.m (or another load sensor/accelerometer) may be positioned proximal to an exciter device 207.1, 207.2, 207.n and configured to transmit a signal to the controller 201 indicative of the actual excitation force applied to the structure-under-test by the exciter device.

Figure 3:
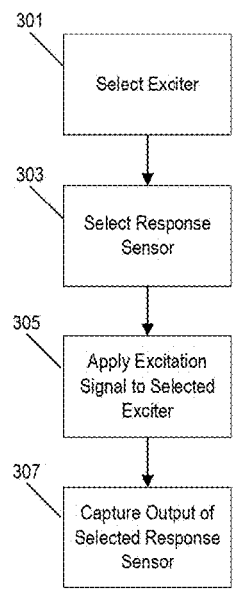
FIG. 3 is a flowchart of a method for performing the automated SRF measurement process using the system of FIG. 2.

FIG. 3 illustrates a first example of a method performed by the controller 201 for collecting measurement data when a structure-under-test is coupled to a fixture that is equipped with the instrumentation as described herein. The controller 201 selects a particular exciter device of the plurality of exciter devices 207.1, 207.2, 207.n (step 301) and selects a particular response sensor of the plurality of response sensors 209.1, 209.2, 209.m (step 303). The controller 201 then induces the excitation force into the structure-under-test by apply an excitation signal to the selected exciter device (step 305) and measures the response based on the output signal from the selected response sensor (step 307). In some implementations, where an SRF measurement is determined as a measured response referenced to an applied force, the induced force must also be known. Accordingly, in some implementations, a load cell is also included (e.g., installed between the exciter device and the fixture) and used to measure the actual force applied by the exciter. In some implementations, the controller 201 may be configured to repeat the process of FIG. 3 for multiple different exciter device/response sensor combinations in order to collect enough data to fully characterize the SRF of the structure-under-test.

In some implementations, the controller 201 is further configured to apply a mathematical coordinate transformation in order to determine the excitation forces and corresponding responses at the target point of the structure-under-test (e.g., the center point 103 of the steering mount in the example of FIG. 1). In some implementations, the controller 201 may be configured to perform this mathematical coordinate transformation using one or more of the following: a virtual point transformation, a finite difference approximation, and a multi-point connection. Also, in some implementations, the computational functionality described herein may be distributed across multiple different controllers/computers. For example, a first controller may be used to operate the exciter devices while a second different computer system is configured to receive the sensed data from the response sensors and/or load cells and to perform the coordinate transformation as a post-processing step (e.g., using MATLAB or software).

Figure 4:
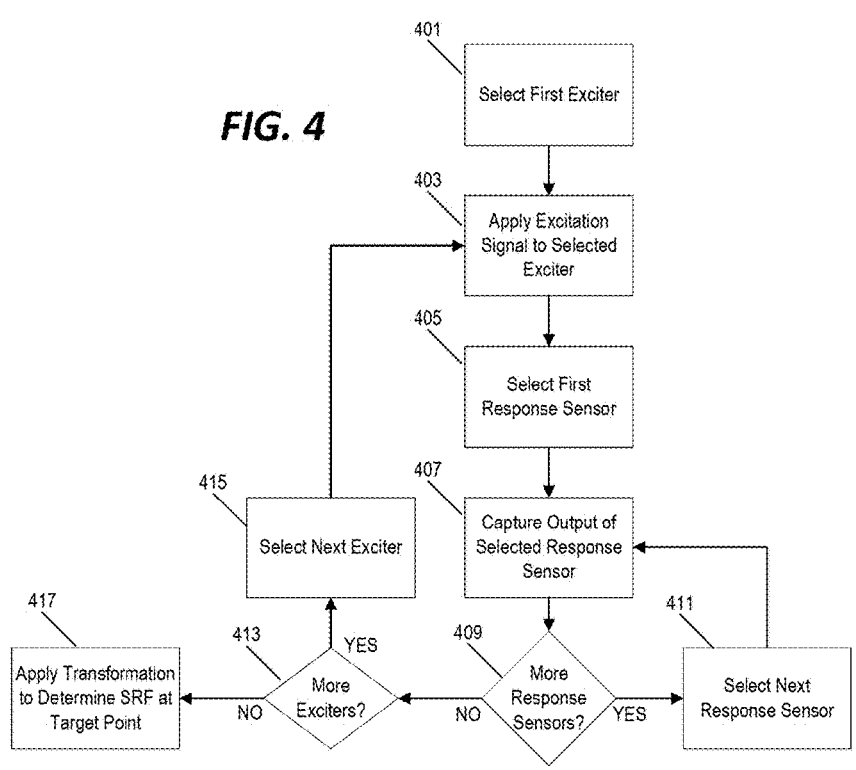
FIG. 4 is a flowchart of another example of a method for performing the automated SRF measurement process using the system of FIG. 2.

FIG. 4 illustrates an example of a method performed by the controller 201 for using a mathematical transform to determine the SRF at a target point of the structure-under-test (e.g., the center point 103 of the steering mount in the example of FIG. 1). The controller 201 selects a first exciter device (step 401) and applies an excitation signal to the selected exciter device (step 403) (while, in some implementations, also measuring the actual applied excitation force using a load cell coupled to the exciter device). The controller 201 then selects a first response sensor (step 405) and captures the output of the selected response sensor (step 407). The controller 201 then selects the next response sensor (step 411) while continuing to apply the excitation signal to the selected exciter device and captures the output of the next selected response sensor (step 407). This is repeated until the controller 201 has received a response signal from each of the plurality of response sensors (step 409). In the example of FIG. 4, only one exciter device is activated at each time and the output of the response sensors are read serially. However, in other implementations, the system may be configured to read the output of all response sensors simultaneously using a multi-channel data acquisition system. Additionally, in some implementations, the system may be designed to operate the exciter devices to apply excitation forces from multiple different excitation devices simultaneously in addition to or instead of operating the excitation devices one-at-a-time.

After collecting response signal measurements from each response sensor while applying the excitation signal to the first exciter device, the controller 201 selects the next exciter device (step 415) and repeats the process of collecting response signal outputs from each response sensor while the excitation signal is applied to the second exciter device. This process is also repeated until response signal data has been collected by the controller 201 from each of the plurality response sensors 209.1, 209.2, 209.m while the excitation signal is applied to each of the plurality of exciter devices 207.1, 207.2, 207.n—or, in other words, until response signal data has been collected by the controller 201 for each of a plurality of exciter device/response sensor combinations. When the excitation signal has been applied to all of the exciter devices (step 413) and the response signal data has been collected from each response sensor (step 409), then the controller 201 applies the mathematical transformation to the collected data in order to determine the system response function at the target point of the structure-under-test (e.g., the center point 103 of the steering mount in the example of FIG. 1) (step 417).

By using one or more fixture mounts (e.g., as described further in the examples below) that are selectively couplable to multiple different structures-under-test (e.g., multiple different steering systems 101 produced by a production/assembly line) and with the instrumentation (e.g., the exciter devices 207.1, 207.2, 207.n and response sensors 209.1, 209.2, 209.m) coupled to (or fixedly incorporated into) the fixture mount, consistent excitation/response measurements can be collected for SRF characterization of multiple different structure-under-test. This reduces measurement time and effort and also eliminates certainly sources of measurement error. Also, because the location and orientation of the instrumentation on each fixture is known and because the fixture is configured to selectively coupled to each structure-under-test at the same known point (e.g., the steering mount of the steering system 101 in the example of FIG. 1), the controller 201 can be pre-programmed and/or pre-calibrated to know the position of the instrumentation relative to a known point on the structure-under test (e.g., the central point 103 of the steering mount in the example of FIG. 1). Forces and moments can then be accurately projected into the central point 103 using a mathematical coordinate transformation. Accordingly, the use of the fixture facilitates full description (e.g., 3 translations and 3 rotations) at the point of interest in the structure-under-test.

In some implementations, as describe in some of the examples below, the fixture design is configured to protect the instrumentation form damage when a different structure-under-test (e.g., the next steering system 101) is coupled to the fixture for SRF measurements. Additionally, in some implementations, the fixture is configured with an application-specific geometric design in order to apply the excitation forces and measure the system response at locations that will provide a more accurate and easy-to-realize transformation.

Figure 5A:
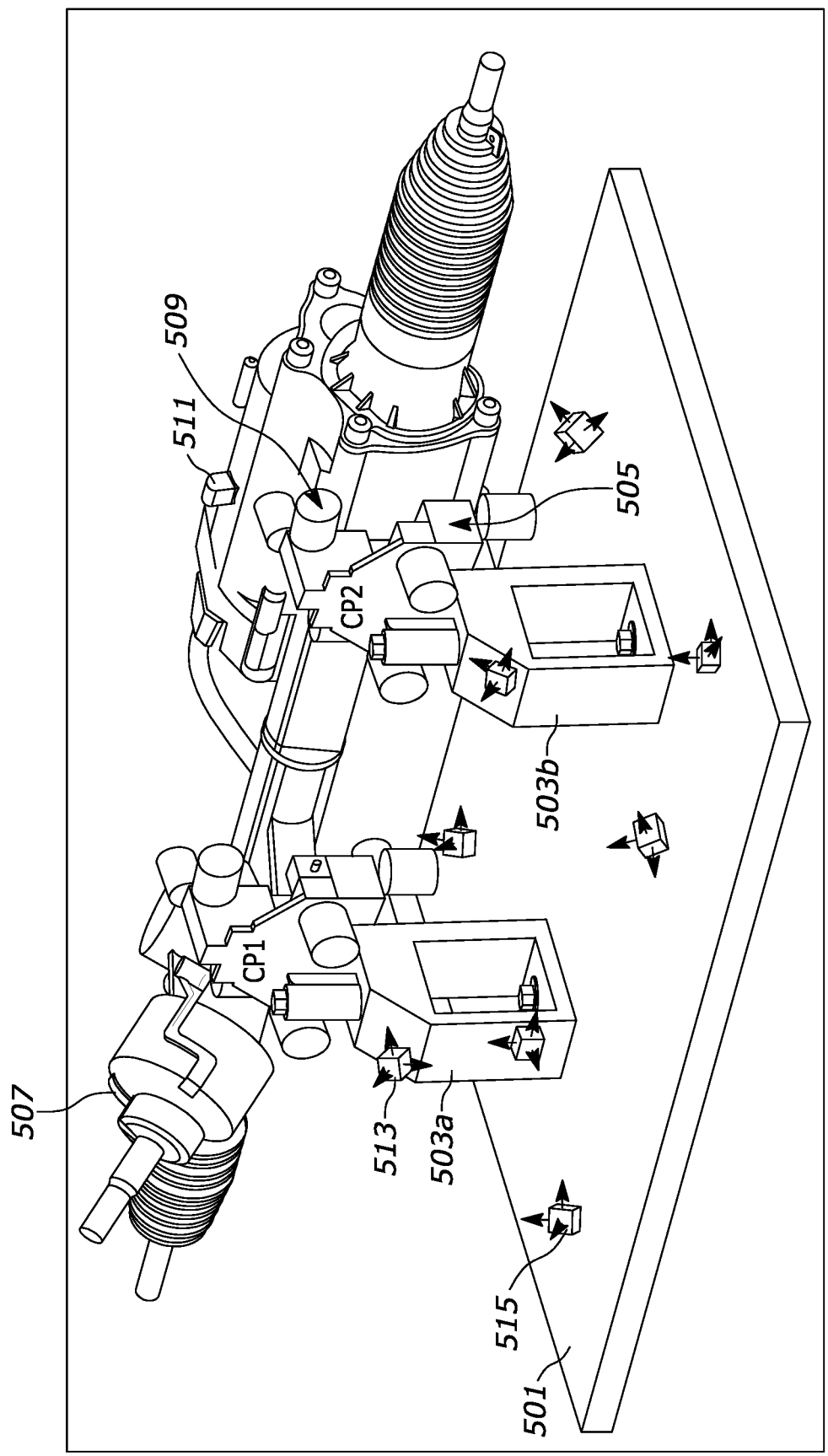
FIG. 5A is a perspective view of a test bench equipped with a pair of C-shaped fixtures for selectively holding a steering gear assembly during the SRF measurement process according to one implementation.

FIG. 5A illustrates an example of a test system for collecting SRF measurements for a steering system 507. The test system includes a test bench platform 501 with two arms 503a, 503b extending from the test bench platform 501. A C-shaped fixture 505 is coupled to the top of each arm 503a, 503b and configured to selectively couple to the steering mounts of the steering system 507. Each C-shaped fixture 505 includes a plurality of exciter devices 509 installed thereon. In some implementations, accelerometers for measuring the applied excitation force and/or the system response to the applied excitation force are also positioned on the steering system 507 (e.g., tri-axial accelerometer 511) and/or downstream of the C-shaped fixture 505. For example, as illustrated in the example of FIG. 5A, an additional tri-axial accelerometer 513 is positioned on the arms 503a, 503b supporting the C-shaped fixture. Additionally, in some implementations (as also illustrated in the example of FIG. 5A), one or more tri-axial accelerometers 515 may be coupled to an acoustic receiver (e.g., a plate that connects the fixture to the test bench). The example of FIG. 5A also illustrates other tri-axial accelerometers positioned at other locations that may be used in addition to or instead of the positions of tri-axial accelerometers 511, 513, and 515. Alternatively or additionally, in some implementations, a plurality of accelerometers are coupled to or incorporated within the C-shaped fixture 505.

Figure 5B:
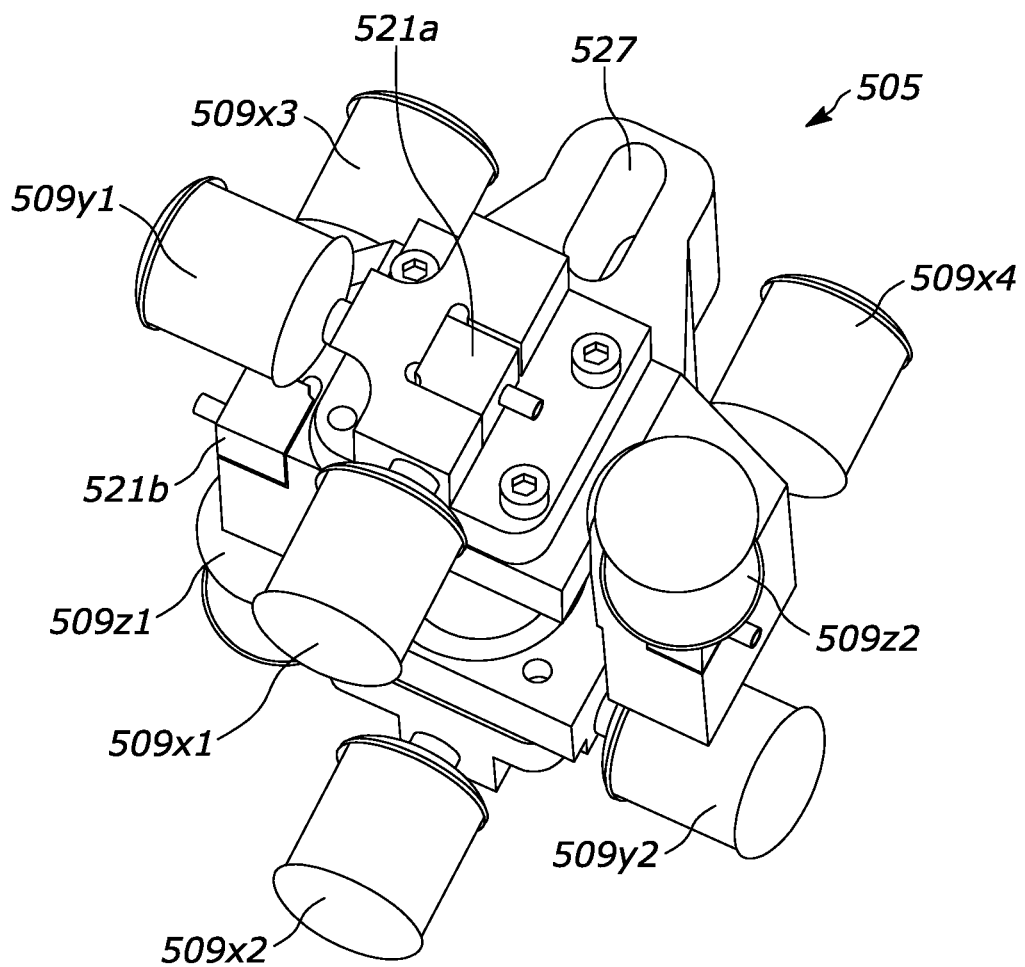
FIGS. 5B through 5E are different perspective views of the C-shaped fixture of FIG. 5A.
Figure 5C:
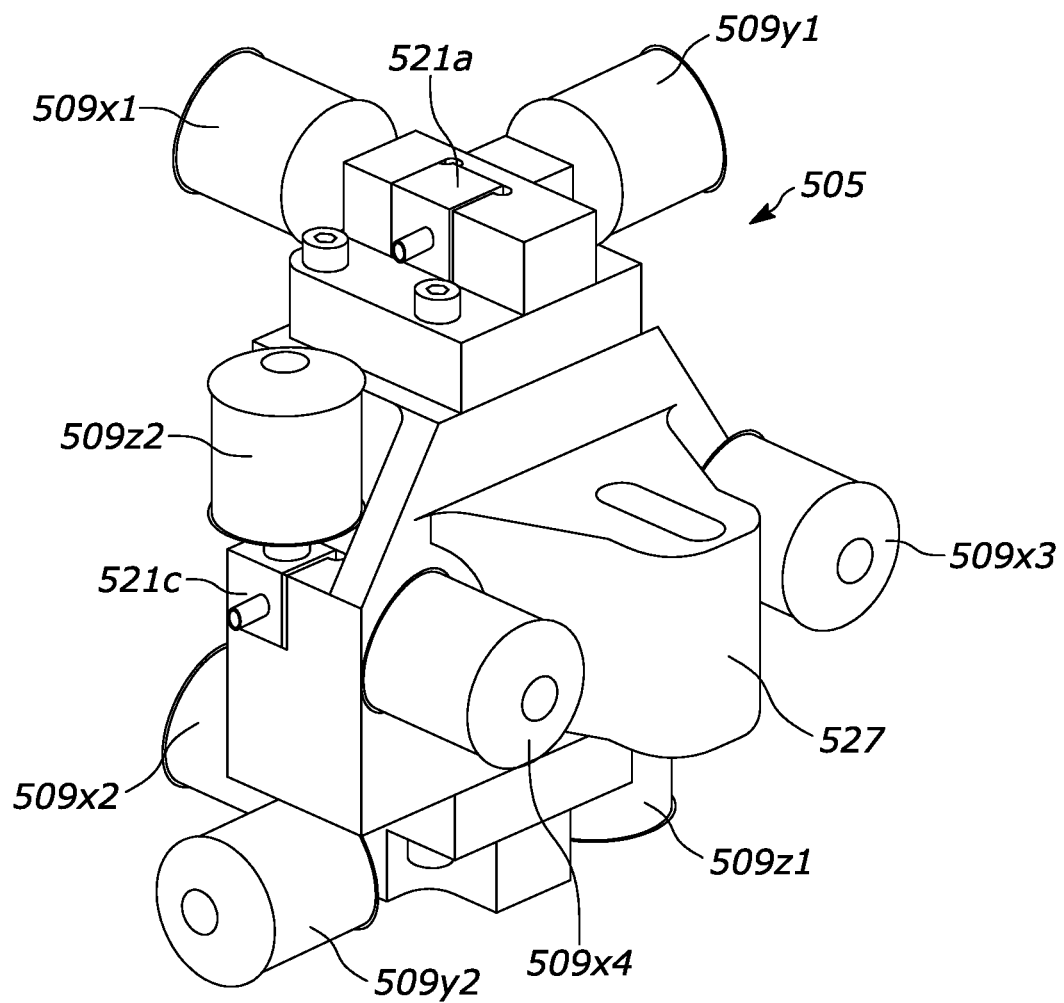
Figure 5D:
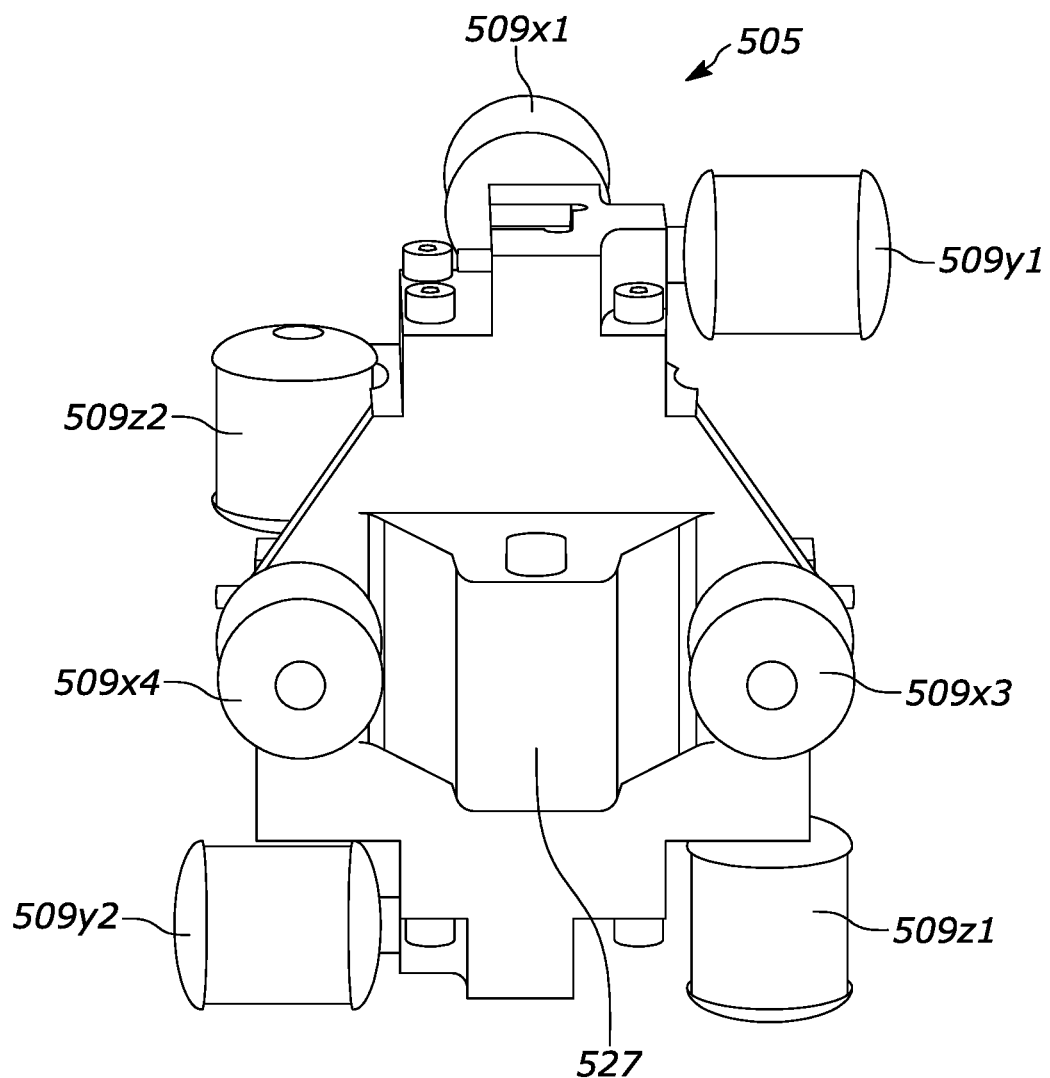

FIGS. 5B through 5E illustrates the C-shaped fixture 505 from different perspectives when the C-shaped fixture 505 is not coupled to the arms 503a, 503b or to the steering system 507. FIG. 5F illustrates the C-shaped fixture 505 with the exciter devices removed to provide an unobstructed view of the geometry of the C-shaped fixture 505 and the placement of the acceleration sensors. The C-shaped fixture 505 is referred to herein as "c-shaped" because a plurality of exciter devices are arranged to apply excitation forces to the C-shaped fixture 505 at locations that generally form the shape of a "c" around a target point 525 where excitation forces and response are to be projected by the mathematical transformation.

This illustrated arrangement of exciter devices is just one example of a potential configuration, and other positions and orientations may be used in other implementations. In some implementations, the exciter devices are configured in a way that every direction and moment at target point 525 is sufficiently excited by the exciter devices. In the example of FIGS. 5B through 5E, the plurality of exciter devices includes four exciter devices $509x1$, $509x2$, $509x3$, $509x4$ positioned and oriented to apply the excitation force in the linear x-direction relative to the C-shaped fixture 505. In particular, two of the x-direction exciter devices $509x1$, $509x2$ are positioned to apply the excitation force above and below the target point 525 (e.g., arranged in the same vertical plane as the center point 525) while the other two x-direction exciter devices $509x3$, $509x4$ are positioned to apply the excitation force on either side of the target point 525 (e.g., arranged in the same horizontal plane as the center point 525).

The plurality of exciter devices also includes two exciter devices $509y1$, $509y2$ positioned and oriented to apply the excitation force in the linear y-direction relative to the C-shaped fixture with one y-direction exciter device $509y1$ positioned to apply the excitation force in the y-direction above the target point 525 and the other y-direction exciter device $509y2$ positioned to apply the excitation force in the y-direction below the target point 525. Both y-direction exciter devices $509y1$, $509y2$ are arranged in the same vertical plane as the target point 525.

Finally, the plurality of exciter devices includes two exciter devices $509z1$, $509z3$ positioned and oriented to apply the excitation force in the linear z-direction relative to the C-shaped fixture with one z-direction exciter device $509z1$ positioned to apply the excitation force in the z-direction on a first side of the target point 525 and the other z-direction exciter device $509z2$ positioned to apply the excitation force in the z-direction on the other side of the target point. Both z-direction exciter devices $509z1$, $509z2$ are arranged in the same vertical plane as the target point 525.

This arrangement of exciter devices illustrated in the example of FIGS. 5B through 5E enables forces to be applied near the target point 525 that are indicative of both translational and rotational forces at the target point 525. For example, the x-direction exciter devices $509x1$, $509x2$ apply forces indicative of translational force in the x-direction and also indicative of rotational forces around the y-axis. Similarly, the other x-direction exciter devices $509x3$, $509x4$ apply forces indicative of translation force in the x-direction and also indicative of rotational forces around the z-axis. The y-direction exciter devices apply forces indicative of translational force in the y-direction and also indicative of rotational forces around the x-axis. The z-direction exciter devices apply forces indicative of translation force in the z-direction and also indicative of rotational forces around the x-axis.

The C-shaped fixture 505 includes four tri-axial accelerometers positions around the target point 525 and arranged in the same y-z plane as the target point 525. A first tri-axial accelerometer 521a is positioned above the target point 525 at a location where excitation forces are applied to the C-shaped fixture by x-direction exciter device $509x1$ and y-direction exciter device $509y1$. A second tri-axial accelerometer 521b is positioned on a first side of the target point 525 in the same horizontal plane as the target point 525 at a location where excitation forces are applied to the C-shaped fixture by x-direction exciter device 509x3 and z-direction exciter device 509z1. A third tri-axial accelerometer 521c is positioned on a second side of the target point 525 opposite the second tri-axial accelerometer 521 and in the same horizontal plane as the target point 525 at a location where excitation forces are applied to the C-shaped fixture by x-direction exciter device 509x4 and z-direction exciter device 509z2. Finally, a fourth tri-axial accelerometer 521d is positioned below the target point 525 at a location where excitation forces are applied to the C-shaped fixture by x-direction exciter device 509x2 and by y-direction exciter device 509y2.

In the example of FIGS. 5A through 5F, the first tri-axial accelerometer 521a and the fourth tri-axial accelerometer 521d align with the target point 525 along the z-axis. Similarly, in the example of FIGS. 5A through 5F, the second tri-axial accelerometer 521b and third tri-axial accelerometer 521c align with the target point 525 along the y-axis. The tri-axial sensors are used to measure the combined dynamic response of the structure-under-test and the fixture coupled thereto. The four tri-axial sensors illustrated in the example of FIGS. 5A through 5F are arranged in a "cross-pattern" to perform a coordinate transformation with the acceleration response data. This way "virtual" responses (i.e., 3 translations and 3 rotations) can be calculated at the target point 525 using the four sensors in the proximity. Other sensor positions and orientations may be utilized in other implementations.

Although not illustrated in the example of FIGS. 5A through 5F, in some implementations, the C-shaped fixture 505 is also equipped with a plurality of load cells integrated into each exciter device or positioned between each exciter device and the C-shaped fixture. These load cells measure the actual excitation force applied to the C-shaped fixture by each corresponding exciter device. Accordingly, in some implementations, the system is configured to perform two coordinate transformations. First, the eight applied forces (i.e., measured by the load cells) are projected into the center of the steering mount to obtain "virtual excitations" by three forces and three moments. Then, the responses from the four response sensors are projected onto the same point to obtain "virtual responses" at the target point 525. These are the structural acceleration responses (three translational and three rotational) due to the "virtually applied forces."

Figure 5E:
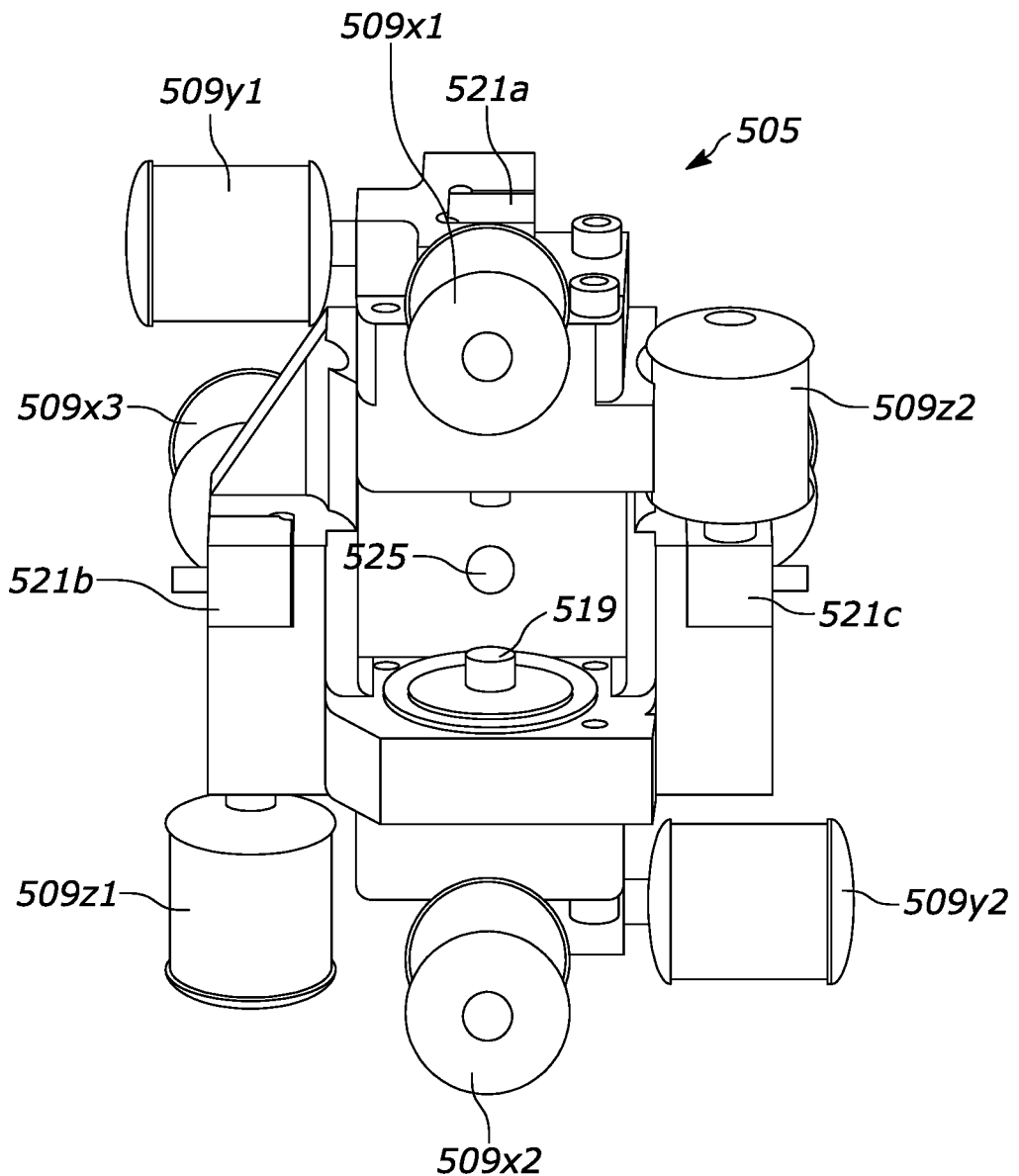
Figure 5F:
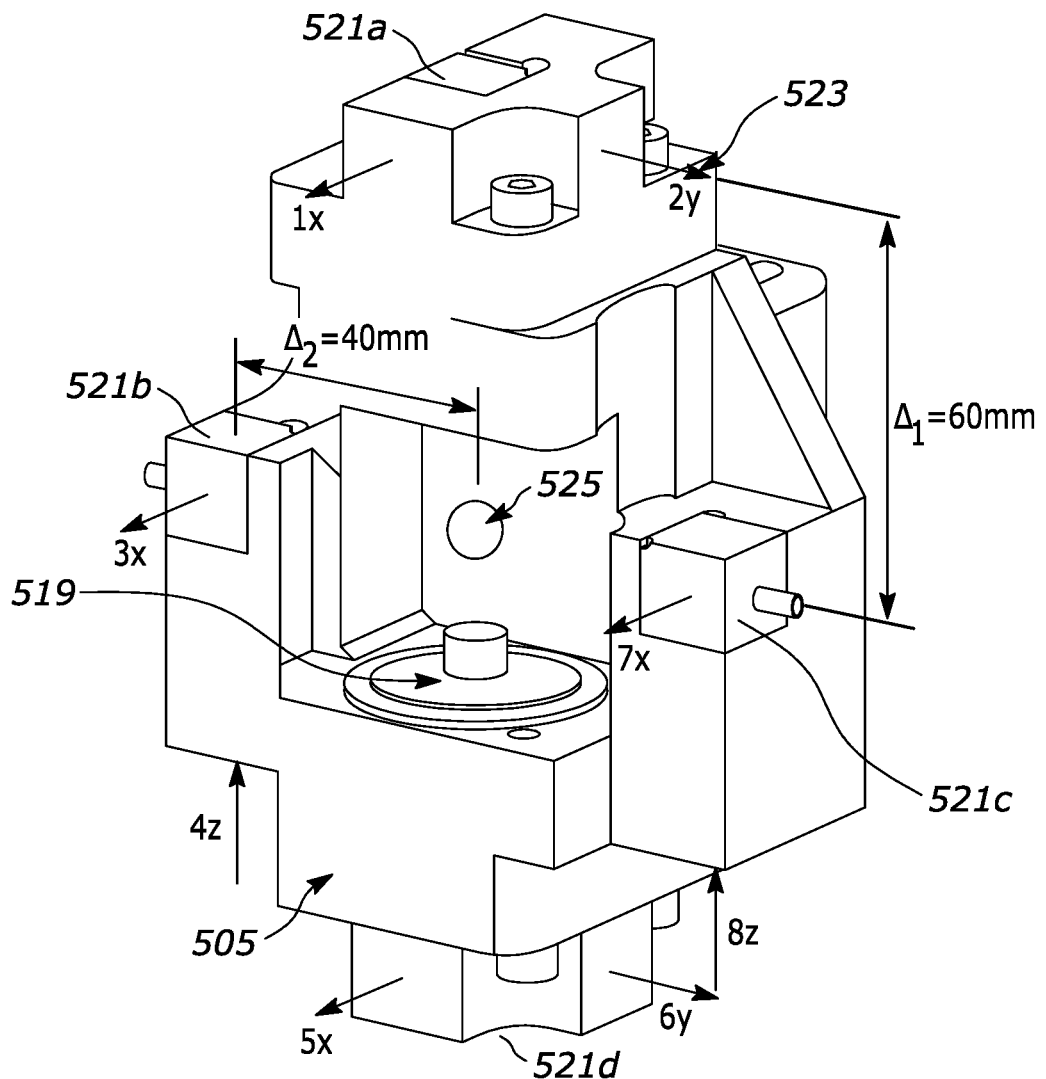
FIG. 5F is a perspective view of the C-shaped fixture of FIG. 5A without the exciter devices to illustrate other details of the C-shaped fixture structure.

As seen in FIGS. 5E and 5F, the C-shaped fixture 505 includes an installation aid 519 to correctly align the steering system 507 with the C-shaped fixture 505 and to couple the steering gear 507 to the C-shaped fixture 505. The installation aid 519 also facilitates consistent coordinate compatibility between SRF measurements for different steering systems 507. In this example, the installation aid 519 includes an upwardly facing cylindrical protrusion positioned and sized to engage an opening in the steering mount of the steering system 507. Additionally, as seen in FIGS. 5B, 5C, and 5D, the C-shaped fixture 505 includes an integrally-formed mounting bracket 527 configured to couple the C-shaped fixture 505 to an arm 503a, 503b of the test system. As shown in FIG. 5A, each C-shaped fixture 505 is coupled to an arm 503a, 503b by extending a bolt through the opening of the mounting bracket 527 and engaging the bolt to the arm 503a, 503b.

The C-shaped fixture 505 provides spaced force application and response measurements to facilitate finite different approximation to project the excitation forces and response measurements to the target point 525 (i.e., a center point of the steering mount). The C-shaped fixture 505 includes eight exciter devices and four accelerometers that are installed on (e.g., fixedly coupled to) the C-shaped fixture 505 such that the same instrumentation can be used for automated SRF measurements for multiple different steering systems 507. The known position of the exciter devices and, in some implementations, the output signals from the load cells enables the controller 201 to determine a known input force (i.e., an actual excitation force) applied to the C-shaped fixture 505.

As noted above, in various implementations, the geometry of the fixture can be designed for a specific application. Accordingly, the C-shaped fixture 505 of FIGS. 5A through 5F is designed for collecting SRF measurements for a steering system 507 that includes two steering mounts and where the controller 201 is configured to use a finite difference approximation to project excitation force and response measurements to the target point 525 (i.e., the center point of each steering mount). In contrast, FIGS. 6A through 6E illustrate an example using an L-shaped fixture 607 designed for collecting SRF measurements for a steering system 609 that includes three steering mounts and where the controller 201 is configured to use a virtual point transformation to project excitation forces and response measurements to the center point of each steering mount.

Figure 6A:
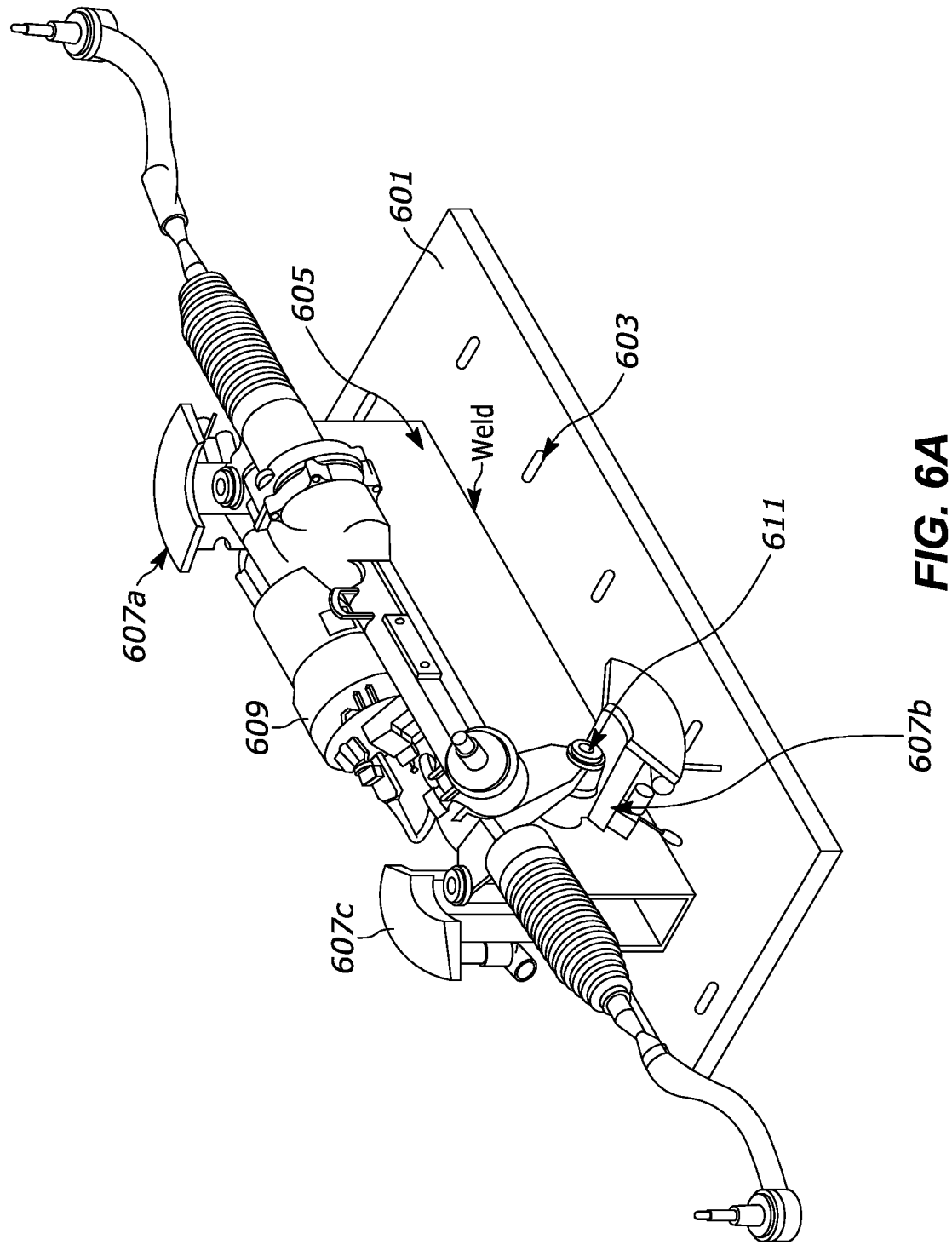
FIG. 6A is a perspective view of a test bench equipped with three L-shaped fixtures for selectively holding a steering gear assembly during the SRF measurement process according to another implementation.

FIG. 6A illustrates an example of a test set up that includes a test bench platform 601 that includes a plurality of slots 603 sized and positioned for selectively connecting the test bench platform 601 to T-slot tables. A mounting adapter 605 is also coupled to the test bench platform 601. In the example of FIG. 6A, the mounting adapter is a hollow, linear structure with a rectangular cross-section that is welded to the test bench platform 601. In some implementations, the mounting adapter 605 is a carbon-steel rectangular tube configured with one or more internal sensors and configured for shock-mount cable management. In this example, three L-Shaped fixtures 607a, 607b, 607c are installed on the mounting adapter 605 each positioned at locations corresponding to a different one of the three steering mounts of a steering system 609. For collecting SRF measurements for a steering system 609, the steering system 609 is selectively coupled to the test system by selectively engaging each steering mount 611 to a different one of the L-shaped fixtures 607a, 607b, 607c.

Figure 6B:
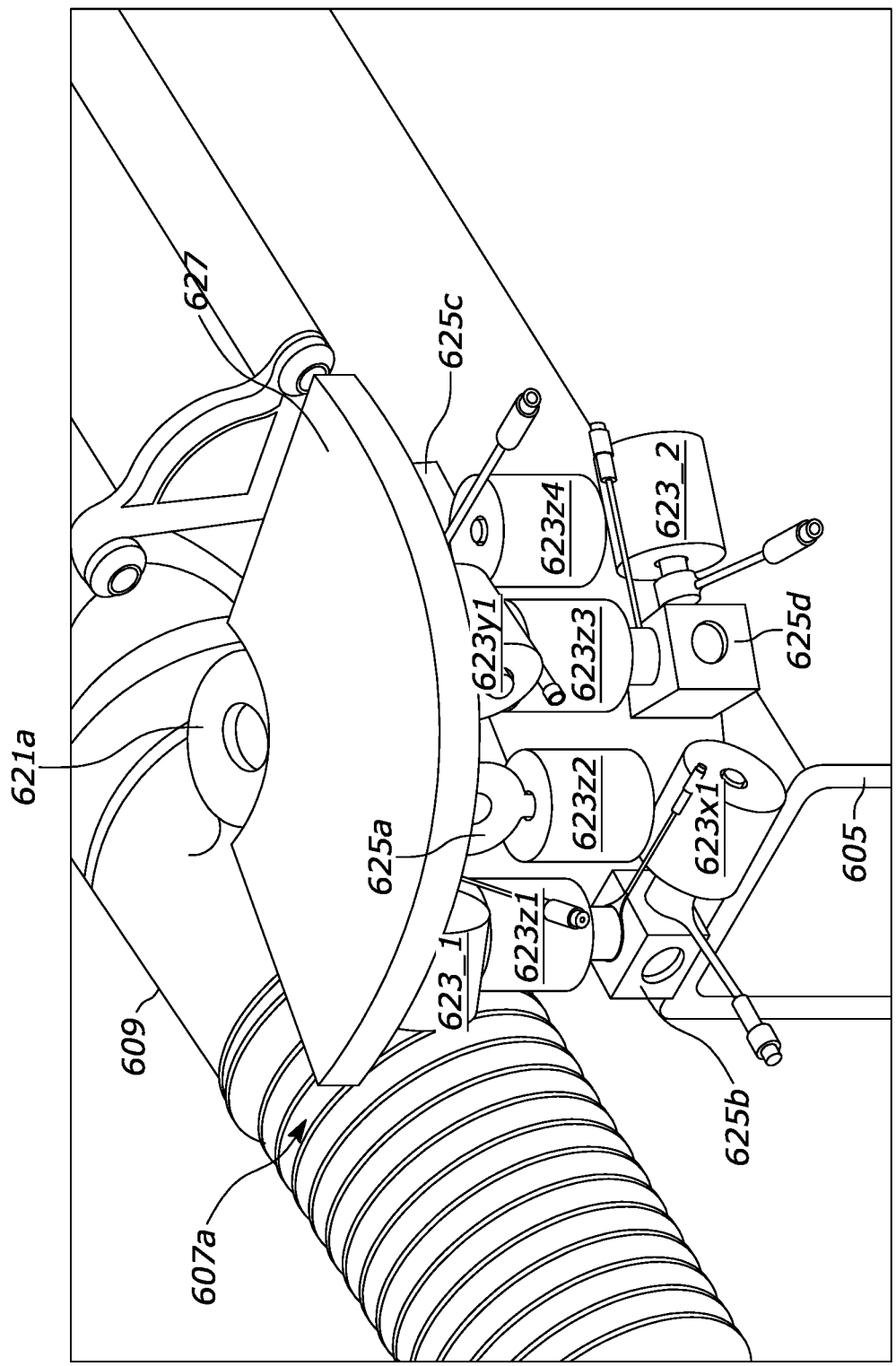
FIG. 6B is a perspective view of the L-shaped fixture of FIG. 6A illustrating the position of the exciter devices.
Figure 6C:
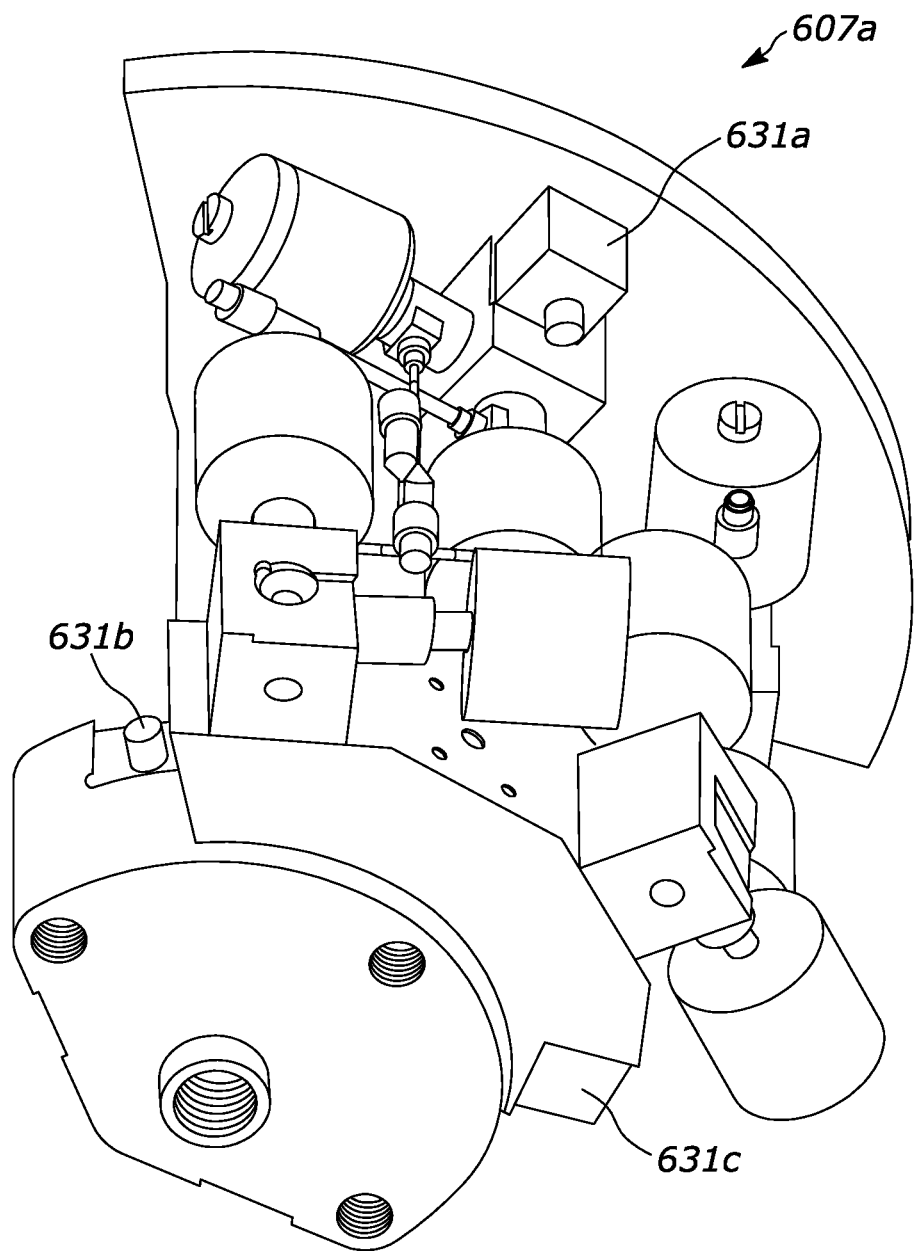
FIG. 6C is a perspective view of an example of the L-shaped fixture of FIG. 6B equipped with three tri-axial accelerometers.
Figure 6D:
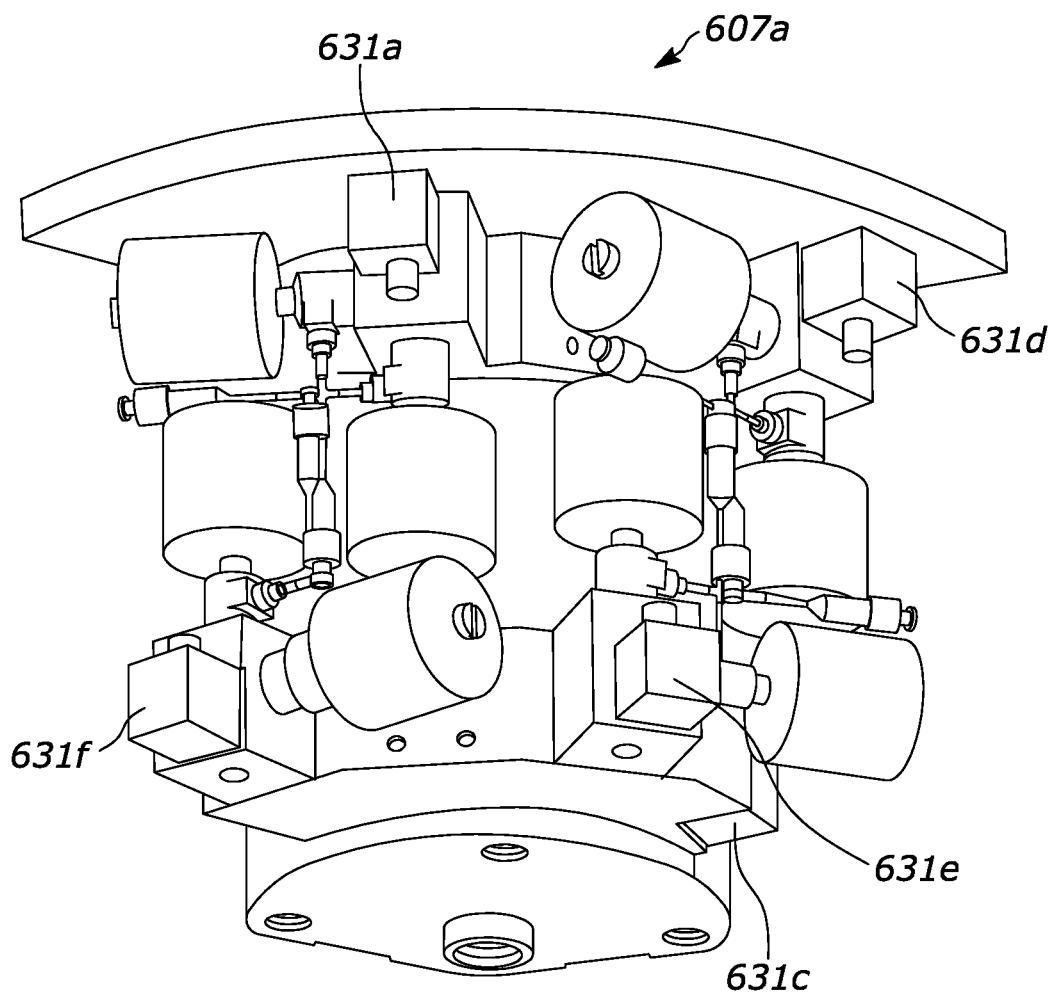
FIGS. 6D and 6E are different perspective views of another example of the L-shaped fixture of FIG. 7B equipped with up to eight tri-axial accelerometers.
Figure 6E:
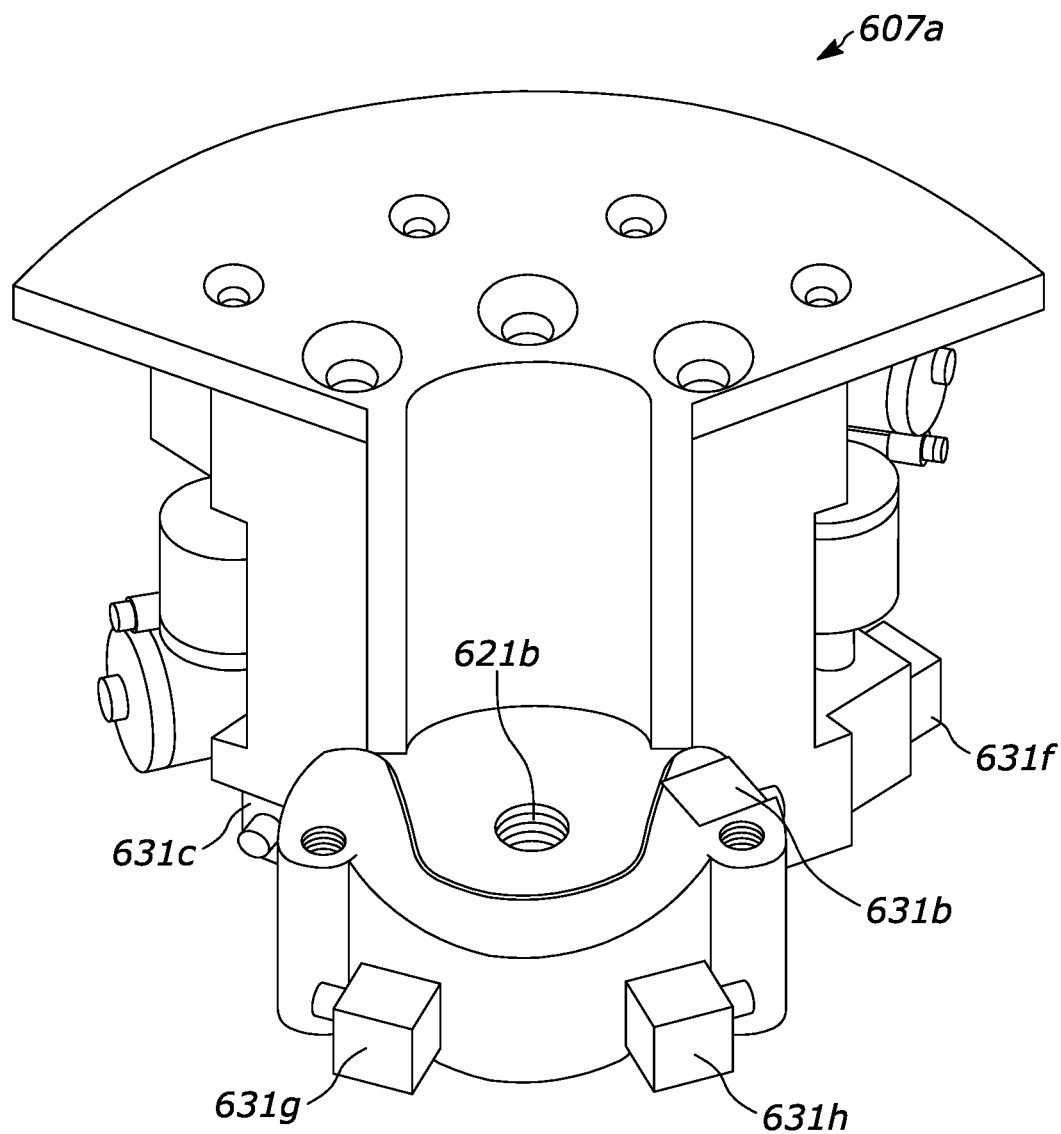

FIGS. 6B through 6E illustrate detailed views of one of the L-shaped fixtures 607a from the example of FIG. 6A. FIG. 6B illustrates an example of the L-shaped fixture 607a with the response sensors omitted to more clearly illustrate the geometry of the L-shaped fixture 607a and the placement & orientation of the exciter devices. FIG. 6C illustrates the L-shaped fixture 607 with a first example configuration of response sensors and FIGS. 6D & 6E illustrates the L-shaped fixture 607 with further examples of response sensor placement that may be used in some implementations in addition to or instead of the response sensor configuration of FIG. 6C. In some implementations, additional response sensors may be added to the mounting adapter 605 and the test bench platform 601 to characterize SRFs between the L-shaped fixture (coordinate transformation of applied excitations to obtain forces and moments in the center of the L-shaped fixture 607) and other "remote" sensors (e.g., additional sensors mounted on the mounting adapter 605 and/or the test bench platform 601).

As illustrated in FIG. 6B, the steering system 609 is coupled to the L-shaped fixture 607a by passing a steering mount bolt 621a through the steering mount opening of the steering system 609. As shown in FIG. 6E, the L-shaped fixture 607a includes a helically threaded opening 621b that is positioned to receive and engage the steering mount bolt 621a. Accordingly, after positioning the steering mount near the L-shaped fixture 607a and passing the steering mount bolt 621a through the steering mount opening of the steering system 609, the steering mount bolt 621a is rotated to engage the threaded opening 621b by screw action and tightened to rigidly secure the steering system 609 to the L-shaped fixture 607a.

The L-shaped fixture 607a in this example includes eight exciter devices 623x1, 623y1, 623z1, 623z2, 623z3, 623z4, 623_1, 623_2. A main body of the L-shaped fixture 607a includes four mounting protrusions 625a, 625b, 625c, 625d. In some implementations, each mounting protrusion 625a, 625b, 625c, 625d is integrally formed as a part of the main body of the L-shaped fixture 607a (e.g., as part of a single molded body) while, in some other implementations, the mounting protrusions 625a, 625b, 625c, 625d are coupled to the main body of the L-shaped fixture, for example, by one or more mounting bolts. Each mounting protrusion 625a, 625b, 625c, 625d is generally cube-shaped and, therefore, presents five different exposed planar faces. In some implementations, the exciter devices 623x1, 623y1, 623z1, 623z2, 623z3, 623z4, 623_1, 623_2 are coupled to some of the exposed planar faces of the mounting protrusions 625a, 625b, 625c, 625d. The L-shaped fixture 607a also includes a protection plate 627 positioned to shield the instrumentation (e.g., the exciter devices and/or response sensors) from physical damage (e.g., accidental impact from other objects).

As illustrated in FIG. 6B, in this example, two exciter devices are mounted to each mounting protrusion 625a, 625b, 625c, 625d. in this example, the exterior surface of the main body of the L-shaped fixture 607a has a curvilinear shape (e.g., in the x-y plane cross-section). The placement of the mounting protrusions along this curvilinear surface affects the relative orientation of the exposed planar faces of the mounting protrusions and, in turn, affects the relative orientation of the exciter devices mounted thereto. In the example of FIGS. 6A through 6E, each mounting protrusion 625a, 625b, 625c, 625d includes an exposed top planar face and an exposed bottom planar face (e.g., horizontal planar faces) that are all parallel to each other. The remaining expose planar faces of each mounting protrusion 625a, 625b, 625c, 625d (e.g., the vertical planar faces) are all perpendicular to the plane (e.g., the x-y plane) that is parallel to the horizontal planar faces. However, due to the curvilinear shape of the main body of the L-shaped fixture 607a, the vertical planar faces of each mounting protrusion 625a, 625b, 625c, 625d are not necessarily parallel to the vertical planar faces of the other mounting protrusions.

As shown in FIG. 6B, in this example, the mounting protrusion 625b and the mounting protrusion 625c are positioned on opposite ends of the curvilinear shape of the main body and, as a result are perpendicularly positioned relative to each other such that each exposed planar face of mounting protrusion 625b is perpendicular to the corresponding exposed planar face of the mounting protrusion 625c (i.e., the outwardly facing planar face of the mounting protrusion 625b is in a plane that is perpendicular to the plane occupied by the outwardly facing planar face of the mounting protrusion 625c). However, the placement of the mounting protrusion 625a and the mounting protrusion 625d are at other positions between the ends of the curvilinear shape of the main body and, accordingly, are arranged at other relatively angles. Accordingly, in this example, the outwardly facing planar face of the mounting protrusion 625a is in a plane that is angularly offset from the plane occupied by the outwardly facing planar face of the mounting protrusion 625b by 30° and that is angularly offset from the plane occupied by the outwardly facing planar face of the mounting protrusion 625c by 60°. Similarly, in this example, the outwardly facing planar face of the mounting protrusion 625d is in a plane that is angularly offset from the plane occupied by the outwardly facing planar face of the mounting protrusion 625c by 30° and that is angularly offset from the plane occupied by the outwardly facing planar face of the mounting protrusion 625b by 60°.

In this example, each exciter device is configured to impart an excitation force in a direction that is perpendicular to the surface to which the exciter device is mounted. Accordingly, in this example, the exciter devices that are mounted to the vertical planar faces of the mounting protrusions 625a, 625b, 625c, 625d are all configured to impart an excitation force in a direction that is parallel to the x-y-plane, but the direction of the imparted excitation force is not parallel to any single common axis. Conversely, in this example, the exciter devices that are mounted to the horizontal planar faces of the mounting protrusions 625a, 625b, 625c, 625d are all configured to impart an excitation force in a direction that is parallel to a single common axis (e.g., parallel to z-axis), but the direction of the imparted excitation forces are not all parallel to a common place.

As shown in FIG. 6B, the exciter devices 623z1, 623z2, 623z3, and 623z4 are each coupled to a horizontal planar face of mounting protrusions 625b, 625a, 625d, and 625c, respectively. Therefore, the exciter devices 623z1, 623z2, 623z3, and 623z4 are each configured to impart an excitation force in a direction parallel to the same axis (i.e., the z-axis of the L-shaped fixture 607a). However, due to the curvilinear shape of the main body of the L-shaped fixture 607a, the excitation forces imparted by the exciter devices 623z1, 623z2, 623z3, and 623z4 are not parallel to a single shared plane.

The other exciter devices 623_1, 623x1, 623y1, and 623_2 are each coupled to a vertical planar face of the mounting protrusions 625a, 625b, 625c, and 625d, respectively. Therefore, the exciter device 623_1, 623x1, 623y1, and 623_2 are each configured to impart an excitation force in a direction parallel to the same plane (i.e., the x-y plane of the L-shaped fixture 607a). Due to the curvilinear shape of the main body of the L-shaped fixture 607a, the excitation forces imparted by the exciter devices 623_1, 623x1, 623y1, and 623_2 are not parallel to the same axis. However, due to the placement of the mounting protrusion 625b and the mounting protrusion 625c at opposite ends of the curvilinear shape, the directions of the excitation forces imparted by the exciter device 623x1 and the exciter device 623y1 are perpendicular to each other in the x-y plane (i.e., the excitation force imparted by the exciter device 623x1 is parallel to the x-axis while the excitation force imparted by the exciter device 623y1 is parallel to the y-axis). Additionally, the direction of the force imparted by the exciter device 623_1 is parallel to the x-y plane, but is angularly offset from the x-axis by 30°, and the direction of the excitation force imparted by the exciter device 623_2 is parallel to the x-y plane, but angularly offset from the y-axis by 30°.

The arrangement of mounting protrusions and exciter devices illustrated in FIG. 6B is just one example and, in other implementations, the L-shaped fixture may include more or fewer mounting protrusions. Additionally, in some implementations, the relatively angles of the mounting protrusions (and, in turn, the direction of the excitation forces imparted by the exciter devices) can be altered by changing the shape of the exterior surface of the main body of the L-shaped fixture and/or by adjusting the position of the mounting protrusions along the exterior face. Furthermore, in some implementations, the exterior face of the main body of the L-shaped fixture may have a shape that is not curvilinear. For example, in some implementations, curvilinear exterior face of the main body of the L-shaped fixture may be replaced by two or more planar faces and the relative angles of the direction of the excitation forces imparted by the exciter devices can be varied by relatively placement of the exciter devices and/or the mounting protrusions on different planar faces of the main body of the L-shaped fixture.

Returning now to the example of FIG. 6B, the L-shaped fixture 607a includes a total of eight exciter devices: four exciter devices 623z1, 623z2, 623z3, 623z4 each configured to impart an excitation force in a direction parallel to a same common axis (e.g., the z-axis), but not parallel to any single plane, and four exciter devices 623x1, 623y1, 623_1, 623_2 each configured to impart an excitation force in a direction parallel to same common plane (e.g., the x-y plane), but not parallel to any single axis. Furthermore, the common axis of the excitation forces imparted by the first four exciter devices 623z1, 623z2, 623z3, 623z4 (e.g., the z-axis) is perpendicular to the common plane of the excitation forces imparted by the other four exciter devices 623x1, 623y1, 623_1, 623_2 (e.g., the x-y-plane).

Similar to the example of FIGS. 5A through 5F, the arrangement of excitation devices on the L-shaped fixtures in the example of FIGS. 6A through 6E enables the test system to apply excitation forces with six degrees-of-freedom per mount (e.g., linear x-direction, linear y-direction, linear z-direction, rotational about the x-axis ($\alpha$), rotational about the y-axis ($\beta$), and rotational about the z-axis ($\gamma$)). The response of the steering system 609 to these controllably applied excitation forces are measured by a plurality of response sensors installed or incorporated into the L-shaped fixture 607a and, in some implementations, on the connected structures further downstream (e.g., on the mounting adapter 605 and/or the test bench platform 601). FIG. 6C illustrates a first example in which the L-shaped fixture 607a includes three tri-axial accelerometers 631a, 631b, 631c. The first tri-axial accelerometer 631a is coupled to the outwardly-facing planar face of the mounting protrusion 625a. The second tri-axial accelerometer 631b is positioned in a notch formed in the main body of the L-shaped fixture 607a beyond the end of the curvilinear exterior surface of the main body of the L-shaped fixture 607a and the third tri-axial accelerometer 631c is similarly positioned beyond the other end of the curvilinear exterior surface of the main body of the L-shaped fixture 607a. As shown in FIG. 6E, the second tri-axial accelerometer 631b is positioned adjacent to the threaded opening 621b where the steering mount is coupled L-shaped fixture 607a while the third tri-axial accelerometer 631c is positioned at a further radial distance from the threaded opening 621b and at a slightly lower height along the z-axis than the second tri-axial accelerometer 631b. Accordingly, although the three tri-axial accelerometers 631a, 631b, 631c are all arranged to sense accelerations in a direction parallel to the z-axis, the x-direction measurements and the y-direction measurements of each tri-axial accelerometer 631a, 631b, 631c are at different angular offsets relative to the x-direction measurement and the y-direction measurement of the other tri-axial accelerometers.

In some implementations, a minimum of three tri-axial accelerometers are used to measure responses to the applied excitation forces in order to collect enough data to use the virtual point transformation technique for project excitation forces and measured responses to a target location (e.g., a center point of a steering mount). FIG. 6C illustrates one example of a three-sensor implementation. However, in other implementations, the tri-axial accelerometers used to measure the response of the steering system 609 to the applied excitation forces can be positioned at other locations on the L-shaped fixture 607a. Furthermore, in some other implementations, the L-shaped fixture 607a may be configured to include more than three tri-axial accelerometers in order to "over-determine" a set of equations for the transformation operation.

FIGS. 6D and 6E illustrate further examples of placements for tri-axial accelerometers on the L-shaped fixture 607a that may be used in some implementations instead of or in addition to the placement of the three tri-axial accelerometers 631a, 631b, 631c as illustrated in FIG. 6C. For example, tri-axial accelerometers may be positioned on the outwardly-facing planar face of the other mounting protrusions (i.e., tri-axial accelerometer 631d positioned on the mounting protrusion 625c, tri-axial accelerometer 631f positioned on the mounting protrusion 625b, and tri-axial accelerometer 631e positioned on the mounting protrusion 625d). Additionally or alternatively, in some implementations, response sensors may be positioned at location on the L-shaped fixture 607a at a radial distance from the threaded opening (i.e., the point at which the steering system 609 is coupled to the L-shaped fixture 607a) opposite the curvilinear exterior face of the L-shaped fixture 607a. (e.g. positioned between the L-shaped fixture 607a and the steering system 609). FIG. 6E shows the placement of two tri-axial accelerometers 631g, 631h positioned in notches formed in a mounting platform upon which the steering system 609 rests when coupled to the L-shaped fixture 607a.

FIGS. 6B through 6E illustrate detailed examples of only one L-shaped fixture 607a of the three L-shaped fixtures illustrated in the test system of FIG. 6A. In some implementations, the other two L-shaped fixtures 607b, 607c include the same quantity, type, and arrangement of components as the L-shaped fixture 607a (e.g., as illustrated in FIGS. 6B through 6E). However, in some other implementations, the quantity, type, and/or arrangement of one or both of the other L-shaped fixtures 607b, 607c may be different. For example, the L-shaped fixtures may include different quantities or placement/orientation of exciter devices and/or response sensors.

Also, the example above refer to a Cartesian coordinate system with an x-axis, a y-axis, and a z-axis. However, in some implementations, the fixtures may be positioned at different orientations relative to each other (e.g., the L-shaped fixtures 607a, 607b, 607c illustrated in the example of FIG. 6A). In some implementations, the x-axis, y-axis, and z-axis for each individual fixture is defined relative to the fixture itself and not relative to a global coordinate system. Accordingly, in some such implementations, the z-axis used for one fixture may be angularly offset from a z-axis used for another fixture. In other implementations, the system is configured to use a single global coordinate system for all fixtures. In some implementations, the controller (e.g., controller 201 of FIG. 2) is programmed and/or calibrated to know the relative position and orientation of each exciter device and each response sensor of each fixture used to measure SRF data for a structure-under-test.

Accordingly, the invention provides, among other things, systems and methods for characterizing a system response (e.g., a system response function) of a structure-under-test using a fixture with exciter devices and response sensors mounted thereon and determining the system response at a target location relative to the structure-under-test by projecting to the target location applied excitation forces and measured responses of the fixture and the structure-under-test coupled thereto. Other features and advantages are set forth in the following claims.

What is claimed is:

1. A system for characterizing a response of a structure-under-test, the system comprising:
   a fixture selectively coupleable to the structure-under-test, wherein the fixture is configured to hold the structure-under-test at a known position and known orientation relative to the fixture;
   a plurality of excitation devices, wherein each excitation device of the plurality of excitation devices is coupled to the fixture at a different known location and a different known orientation relative to the fixture and is configured to controllably apply an excitation force to the fixture; and
   a plurality of response sensors, wherein each response sensor of the plurality of response sensors is coupled to the fixture and configured to sense a dynamic response, wherein the excitation force applied to the fixture by each of the excitation devices is conveyed by the fixture to the structure-under-test, and wherein the dynamic response measured by each of the response sensors is indicative of a response of the structure-under-test to the applied excitation force conveyed by the fixture from the structure-under-test to the response sensors,
   wherein the fixture is configured to selectively coupled to the structure-under-test at a coupling point, wherein the plurality of excitation devices includes
   a first x-axis excitation device coupled to the fixture at a first location and configured to apply a first linear excitation force to the fixture,
   a second x-axis excitation device coupled to the fixture at a second location and configured to apply a second linear excitation force to the fixture,
   a third x-axis excitation device coupled to the fixture at a third location and configured to apply a third linear excitation force to the fixture, and
   a fourth x-axis excitation device coupled to the fixture at a fourth location and configured to apply a fourth linear excitation force to the fixture,
   wherein an excitation axis of the first linear excitation force is parallel to an excitation axis of the second linear excitation force, and wherein the first location and the second location are aligned with a coupling point of the fixture along a second axis,
   wherein an excitation axis of the third linear excitation force and an excitation axis of the fourth linear excitation force are parallel to the excitation axis of the first linear excitation force, and wherein the third location and the fourth location are aligned with the coupling point of the fixture along a third axis.

2. The system of claim 1, further comprising a controller configured to
   receive dynamic response data from the plurality of response sensors indicative of the response of the structure-under-test to the applied excitation force;
   apply a mathematical transformation to the received dynamic response data to calculate a dynamic response of the structure-under-test at a target point of the structure-under-test; and calculate a system response function of the structure-under-test based at least in part on the calculated dynamic response at the target point.

3. The system of claim 2, wherein the controller is further configured to
   selectively apply an excitation signal to the plurality of excitation devices, wherein applying the excitation signal to the excitation device causes the excitation device to apply an excitation force corresponding to the excitation signal,
   wherein applying the mathematical transformation includes applying the mathematical transformation to excitation force data indicative of the excitation force applied by the plurality of excitation devices to calculate a corresponding excitation force at the target location of the structure-under-test, and
   wherein calculating the system response function of the structure-under-test includes calculating the system response function based at least in part on the calculated corresponding excitation force at the target location and the calculated dynamic response at the target location.

4. The system of claim 1, wherein the plurality of excitation devices includes a plurality of vibrational shaker devices each configured to apply a vibration force along an operating axis of the vibrational shaker device, wherein the plurality of excitation devices includes a plurality of excitation devices coupled to the fixture at locations and orientations configured to
   apply linear vibrational forces in directions parallel to at least three different axes relative to a target point of the structure-under-test, and
   apply rotational vibrational forces around each of the at least three different axes relative to the target point of the structure-under-test.

5. The system of claim 1, wherein the second axis is perpendicular to the third axis, and wherein the second axis and the third axis are within a plane that is perpendicular to the excitation axis of the first linear excitation force.

6. The system of claim 5, wherein the plurality of excitation devices further includes
   a first y-axis excitation device coupled to the fixture and configured to apply a fifth linear excitation force to the fixture, wherein an excitation axis of the fifth linear excitation force is parallel to the second axis,
   a second y-axis excitation device coupled to the fixture and configured to apply a sixth linear excitation force to the fixture, wherein an excitation axis of the sixth linear excitation force is parallel to the second axis on an opposite side of the coupling point from the excitation axis of the fifth linear excitation force,
   a first z-axis excitation device coupled to the fixture and configured to apply a seventh linear excitation force to the fixture, wherein an excitation axis of the seventh linear excitation force is parallel to the third axis, and
   a second z-axis excitation device coupled to the fixture and configured to apply an eighth linear excitation force to the fixture, wherein the excitation axis of the eighth linear excitation force is parallel to the third axis on an opposite side of the coupling point from the excitation axis of the seventh linear excitation force.

7. The system of claim 6, wherein the plurality of response sensors includes:
   a first tri-axial accelerometer coupled to the fixture at an intersection of the excitation axis of the first linear excitation force applied by the first x-axis excitation device and the excitation axis of the fifth linear excitation force applied by the first y-axis excitation device;
   a second tri-axial accelerometer coupled to the fixture at an intersection of the excitation axis of the second linear excitation force applied by the second x-axis excitation device and the excitation axis of the sixth linear excitation force applied by the second y-axis excitation device;

a third tri-axial accelerometer coupled to the fixture at an intersection of the excitation axis of the third linear excitation force applied by the third x-axis excitation device and the excitation axis of the seventh linear excitation force applied by the first z-axis excitation device; and a fourth tri-axial accelerometer coupled to the fixture at an intersection of the excitation axis of the fourth linear excitation force applied by the fourth x-axis excitation device and the excitation axis of the eighth linear excitation force applied by the second z-axis excitation device.

8. The system of claim 1, wherein a positioning of the first x-axis excitation device and the second x-axis excitation device causes the first x-axis excitation device and the second x-axis excitation device to each apply rotational excitation forces about the third axis, and wherein a positioning of the third x-axis excitation device and the fourth x-axis excitation device causes the third x-axis excitation device and the fourth x-axis excitation device to each apply rotation excitation forces about the second axis.

9. The system of claim 1, wherein the plurality of response sensors includes a plurality of excitation devices coupled to the fixture at locations and orientations configured to
sense linear dynamic responses in directions parallel to at least three different axes relative to a target point of the structure-under-test, and
sense rotational dynamic responses around each of the at least three different axes relative to the target point of the structure-under-test.

10. The system of claim 1, wherein fixture includes a C-shaped fixture that includes a structural body that extends across two opposite sides of a coupling point at which the C-shaped fixture is coupled to the structure-under-test.

11. The system of claim 1, wherein the fixture includes an L-shaped fixture that includes a structure body that extends across two adjacent sides of a coupling point at which the L-shaped fixture is coupled to the structure-under-test.

12. The system of claim 1, further comprising a controller configured to apply a mathematical coordinate transformation to project forces and moments of the excitation forces applied by the excitation devices and dynamic responses sensed by the response sensors to a target point of the structure-under test based at least in part on known locations and known orientations of the excitation devices and the response sensors relative to the target point of the structure-under-test.

13. The system of claim 12, wherein the locations and orientations of the excitation devices and the response sensors relative to the target point of the structure-under-test are known due to a known arrangement of the excitation devices and response sensors on the fixture and a known geometry of the structure-under-test relative to the fixture.

14. The system of claim 12, wherein applying the mathematical coordinate transformation includes applying at least one selected from a group consisting of a virtual point transformation, a finite difference approximation, and a multi-point connection.

15. A method of characterizing a system response function using the system of claim 1, the method comprising:
coupling a first structure-under-test to the fixture;
selectively and controllably operating the plurality of excitation devices to apply a plurality of excitation forces to the first structure-under-test;
receiving force response data from the plurality of response sensors indicative of the response of the first structure-under-test to each of the applied excitation forces;
applying a mathematical coordinate transformation to project forces and moments of the excitation forces applied by the excitation devices and dynamic responses sensed by the response sensors to a target point of the first structure-under test; and
calculating a system response function for the first structure-under-test based at least in part on the projected forces and moments.

16. The method of claim 15, further comprising:
decoupling the first structure-under-test from the fixture;
coupling a second structure-under-test to the fixture;
selectively and controllably operating the plurality of excitation devices to apply the plurality of excitation forces to the second structure-under test, wherein the known position and the known orientation of the excitation devices relative to the fixture is not altered;
receiving force response data from the plurality of response sensors indicative of the response of the second structure-under-test to each of the applied excitation forces;
applying the mathematical coordinate transformation to project forces and moments of the excitation forces applied by the excitation devices and dynamic responses sensed by the response sensors to a target point of the second structure-under test; and
calculating a system response function for the second structure-under-test based at least in part on the projected forces and moments.

\* \* \* \* \*